United States Patent
Baugh et al.

(10) Patent No.: US 12,217,038 B2
(45) Date of Patent: Feb. 4, 2025

(54) METHODS AND APPARATUS TO CONTROL ARCHITECTURAL COVERINGS

(71) Applicant: Hunter Douglas, Inc., Pearl River, NY (US)

(72) Inventors: James Baugh, Lakewood, CO (US); Mark Perry, Thornton, CO (US); David Hoogstrate, Denver, CO (US); Henk Meewis, Arvada, CO (US)

(73) Assignee: Hunter Douglas Inc., New York, NY (US)

( * ) Notice: Subject to any disclaimer, the term of this patent is extended or adjusted under 35 U.S.C. 154(b) by 264 days.

(21) Appl. No.: 16/135,912

(22) Filed: Sep. 19, 2018

(65) Prior Publication Data
US 2019/0095191 A1    Mar. 28, 2019

Related U.S. Application Data

(60) Provisional application No. 62/560,653, filed on Sep. 19, 2017.

(51) Int. Cl.
*G06F 8/65* (2018.01)
*E06B 9/68* (2006.01)
(Continued)

(52) U.S. Cl.
CPC ............ *G06F 8/65* (2013.01); *H04L 12/2814* (2013.01); *H04L 67/125* (2013.01); *H04L 67/34* (2013.01);
(Continued)

(58) Field of Classification Search
CPC ........ G06F 8/65; G06F 8/656; G06F 8/70–71; G06F 8/60–66; H04L 67/16;
(Continued)

(56) References Cited

U.S. PATENT DOCUMENTS 6,959,436 B2 * 10/2005 Peng .................... H04L 29/06
                                                                 719/310
7,079,808 B2    7/2006 Striemer
(Continued)

FOREIGN PATENT DOCUMENTS

CN    101416544 A    4/2009
CN    201682519 U    12/2010
(Continued)

OTHER PUBLICATIONS

The Authoritative Dictionary of IEEE Standards Terms, Seventh Edition, IEEE, Issued: Dec. 11, 2000, Accessed: Aug. 14, 2020 (Year: 2000).*

(Continued)

*Primary Examiner* — Kevin L Young
*Assistant Examiner* — Joanne G Macasiano
(74) *Attorney, Agent, or Firm* — Kilpatrick Townsend & Stockton LLP

(57) ABSTRACT

Methods and apparatus to control architectural coverings are disclosed. An example apparatus includes a network interface to communicatively couple the apparatus with a repository via a network, a wireless covering interface to communicatively couple the apparatus with a first architectural covering, a covering enumerator to determine information about the first architectural covering, and a software collector to: retrieve software for the first architectural covering from a repository via the network interface, transmit an advertisement of the software to the first architectural covering, and in response to receiving a request for the software from the first architectural covering, transmit the software to the first architectural covering.

21 Claims, 8 Drawing Sheets

(51) Int. Cl.
  *H04L 12/28* (2006.01)
  *H04L 67/00* (2022.01)
  *H04L 67/125* (2022.01)
  *H04L 67/51* (2022.01)
  *H04L 67/55* (2022.01)
  *H04L 67/568* (2022.01)
  *H04L 69/08* (2022.01)

(52) U.S. Cl.
  CPC .............. *H04L 67/51* (2022.05); *H04L 67/55* (2022.05); *H04L 67/568* (2022.05); *H04L 69/08* (2013.01); *E06B 9/68* (2013.01); *E06B 2009/6809* (2013.01)

(58) Field of Classification Search
  CPC ..... H04L 67/26; H04L 67/34; H04L 12/2814; H04L 67/125; H04L 67/2842; H04L 69/08; E06B 9/68; E06B 2009/6809
  See application file for complete search history.

(56) References Cited

U.S. PATENT DOCUMENTS

| | | | |
|---|---|---|---|
| 7,987,490 | B2 | 7/2011 | Ansari et al. |
| 8,031,726 | B2 | 10/2011 | Ansari et al. |
| 8,078,688 | B2 | 12/2011 | Ansari et al. |
| 8,180,735 | B2 | 5/2012 | Ansari et al. |
| 8,205,240 | B2 | 6/2012 | Ansari et al. |
| 8,280,978 | B2 | 10/2012 | Ansari et al. |
| 8,281,010 | B2 | 10/2012 | Ansari et al. |
| 8,369,326 | B2 | 2/2013 | Ansari et al. |
| 8,386,465 | B2 | 2/2013 | Ansari et al. |
| 8,397,264 | B2 | 3/2013 | Ansari et al. |
| 8,443,071 | B2 | 5/2013 | Lu et al. |
| 8,478,450 | B2 | 7/2013 | Lu et al. |
| 8,543,665 | B2 | 9/2013 | Ansari et al. |
| 8,583,955 | B2 | 11/2013 | Lu et al. |
| 8,649,883 | B2 | 2/2014 | Lu et al. |
| 8,666,560 | B2 | 3/2014 | Lu et al. |
| 8,761,050 | B2 | 6/2014 | Lu et al. |
| 8,769,327 | B2 | 7/2014 | Lu et al. |
| 8,826,046 | B2 | 9/2014 | Lu et al. |
| 8,856,289 | B2 | 10/2014 | Ansari et al. |
| 8,971,341 | B2 | 3/2015 | Ansari et al. |
| 8,972,858 | B2 | 3/2015 | Madonna et al. |
| 9,209,995 | B2 | 12/2015 | Ansari et al. |
| 9,253,150 | B2 | 2/2016 | Ansari et al. |
| 9,270,492 | B2 | 2/2016 | Ansari et al. |
| 9,323,239 | B2 | 4/2016 | Madonna et al. |
| 9,335,750 | B2 | 5/2016 | Lu et al. |
| 9,366,082 | B2* | 6/2016 | Feldstein ................. E06B 9/32 |
| 9,430,021 | B2 | 8/2016 | Lu et al. |
| 9,569,587 | B2* | 2/2017 | Ansari .................... H04L 63/08 |
| 2001/0002914 | A1† | 6/2001 | Aramoto |
| 2002/0078209 | A1* | 6/2002 | Peng ...................... H04L 29/06 709/227 |
| 2005/0080879 | A1† | 4/2005 | Kim |
| 2005/0210034 | A1* | 9/2005 | Howard .................. H04L 67/02 |
| 2007/0237094 | A1 | 10/2007 | Bi et al. |
| 2008/0092132 | A1 | 4/2008 | Stuber et al. |
| 2009/0112630 | A1* | 4/2009 | Collins, Jr. ............ G16H 80/00 705/3 |
| 2011/0122854 | A1 | 5/2011 | De Lind Van Wijngaarden |
| 2011/0276657 | A1 | 11/2011 | LeBlanc et al. |
| 2014/0006555 | A1* | 1/2014 | Shields ................... H04L 67/12 709/217 |
| 2014/0259074 | A1 | 9/2014 | Ansari et al. |
| 2015/0002276 | A1 | 1/2015 | Kicklighter et al. |
| 2015/0074259 | A1 | 3/2015 | Ansari et al. |
| 2015/0160634 | A1† | 6/2015 | Smith |
| 2015/0347683 | A1* | 12/2015 | Ansari .................... H04L 63/08 726/7 |
| 2016/0073474 | A1 | 3/2016 | Van De Sluis et al. |
| 2016/0149411 | A1* | 5/2016 | Neyhart .............. H04L 12/2807 700/295 |
| 2016/0195859 | A1 | 7/2016 | Britt et al. |
| 2016/0195881 | A1 | 7/2016 | Britt et al. |
| 2016/0197769 | A1 | 7/2016 | Britt et al. |
| 2016/0197772 | A1 | 7/2016 | Britt et al. |
| 2016/0197786 | A1 | 7/2016 | Britt et al. |
| 2016/0197798 | A1 | 7/2016 | Britt et al. |
| 2016/0198465 | A1 | 7/2016 | Britt et al. |
| 2016/0198536 | A1 | 7/2016 | Britt et al. |
| 2016/0216703 | A1 | 7/2016 | Madonna et al. |
| 2016/0226823 | A1 | 8/2016 | Ansari et al. |
| 2016/0226920 | A1 | 8/2016 | Ansari et al. |
| 2016/0254962 | A1 | 9/2016 | Ansari et al. |
| 2016/0330200 | A1 | 11/2016 | Ansari et al. |
| 2016/0345126 | A1 | 11/2016 | Granbery |
| 2017/0094017 | A1 | 3/2017 | Jakobs |
| 2017/0280266 | A1* | 9/2017 | Brisebois ........... H04B 7/18578 |
| 2018/0176769 | A1* | 6/2018 | Gupta ...................... G06F 8/65 |

FOREIGN PATENT DOCUMENTS

| | | |
|---|---|---|
| CN | 202870582 U | 4/2013 |
| CN | 102668460 B | 6/2016 |
| CN | 105493484 B | 11/2018 |

OTHER PUBLICATIONS

Wiley Online Library, http://onlinelibrary.wiley.com, Accessed: Aug. 14, 2020 (Year: 2020).*

The ATIS Telecom Glossary , /https://glossary.atis.org/, Alliance for Telecommunications Industry Solutions, Accessed: Aug. 14, 2020 (Year: 2019).*

Hunter Douglas, "PowerView Motorization," https://www.hunterdouglas.com/operating-systems/motorized/powerview-motorization, retrieved on Nov. 30, 2018, 3 pages.

European Patent Office, "Extended European Search Report," issued in connection with Application No. 18195527.9-1213, on Jan. 31, 2019, 8 pages.

First Office Action and Search Report for CN 201811097367.4 mailed Oct. 8, 2021, all pages.

Examination report for EP 18 195 527.9 mailed Dec. 21, 2021, 6 pages.

Fourth Office Action for Chinese Appln No. 201811097367.4 dated Jun. 30, 2023, 9 pages.

\* cited by examiner
† cited by third party

METHODS AND APPARATUS TO CONTROL ARCHITECTURAL COVERINGS

RELATED APPLICATIONS

This patent claims the benefit of U.S. Provisional Patent Application Ser. No. 62/560,653, filed Sep. 19, 2017. U.S. Provisional Patent Application Ser. No. 62/560,653 is hereby incorporated herein by reference in its entirety.

FIELD OF THE DISCLOSURE

This disclosure relates generally to architectural coverings and, more particularly, to methods and apparatus to control architectural coverings.

BACKGROUND

Architectural coverings such as roller blinds, vertical window coverings, horizontal window coverings, and spring-loaded window coverings provide shading and privacy. Such architectural coverings often include a motorized assembly coupled with a covering fabric or other shading material. In particular, a motor rotates a rotational member, such as a roller tube or lift rod, to raise, lower, retract, extend, reposition, etc. the cover or shading material. Architectural coverings often include a controller to monitor and/or control operation of the motorized assembly. Such controllers often include a control interface such as a remote-control interface to receive operation instructions.

BRIEF DESCRIPTION OF THE DRAWINGS

Methods and apparatus to control architectural coverings are disclosed herein. In particular, implementations include a hub to control architectural coverings. Implementations of hubs constructed in accordance with principles of inventions disclosed herein will be described with reference to the following drawings, which are not to be considered as limiting, but rather, are illustrations of examples of manners of implementing principles of the disclosure. Many other implementations will occur to persons of ordinary skill in the art upon reading this disclosure.

DETAILED DESCRIPTION

Figure 1:
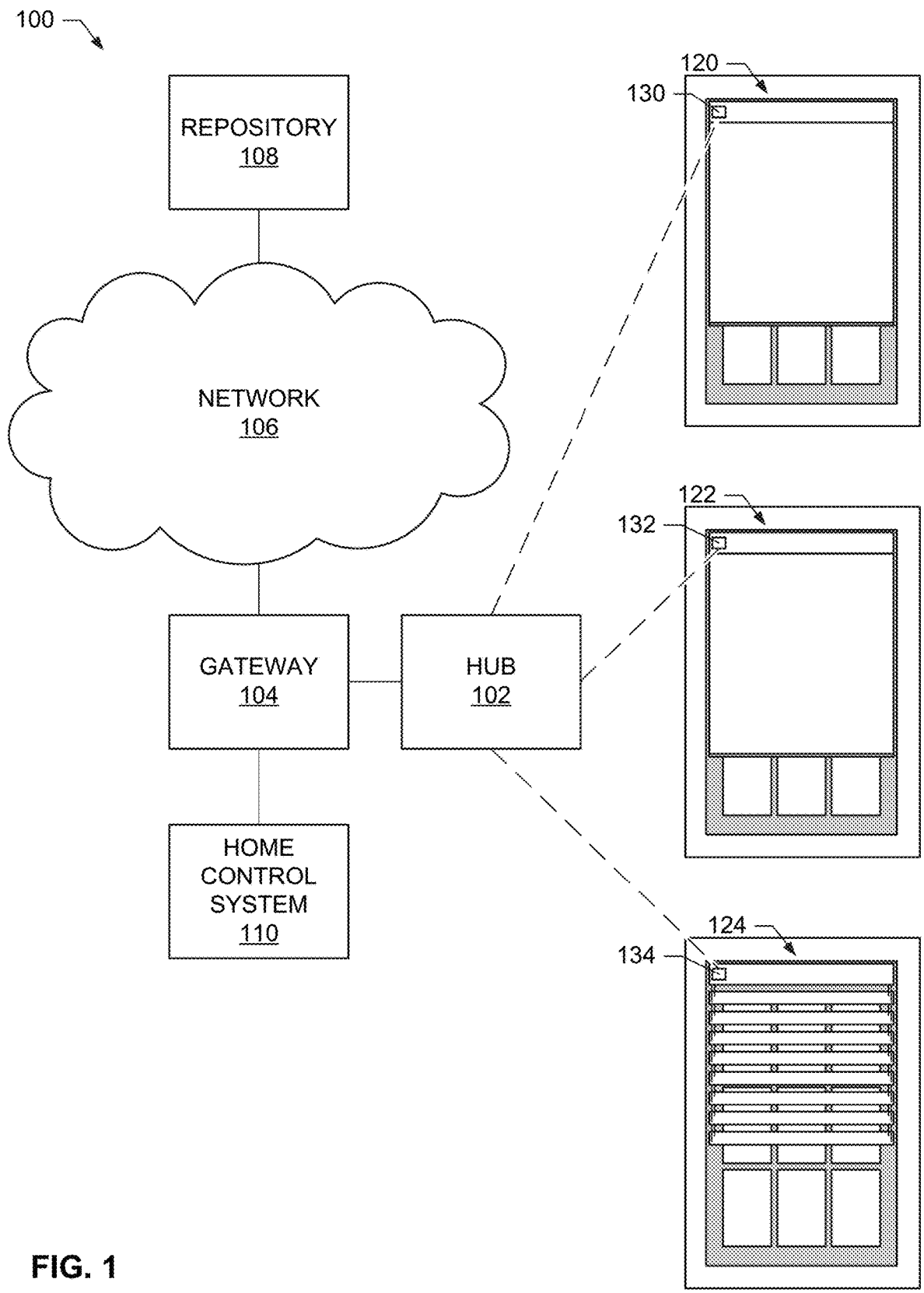
FIG. 1 illustrates an example of an environment including a hub, a gateway, a network, a repository, a home control system, and architectural coverings.

Disclosed herein are example methods and apparatus to control architectural coverings. Some disclosed examples include a hub that is a computing device that communicates with and controls the operation of the architectural coverings (e.g., a hub that communicates with a controller integrated with the architectural coverings). For example, the hub may be a system-on-a-chip (SoC) that is programmed to control the operation of the architectural coverings via wireless communication with respective controllers of the architectural coverings. In some disclosed examples, the hub is installed in a building at which the architectural coverings are installed and/or is in a wireless communication range of the architectural coverings. For example, the hub may direct a controller of an architectural covering to operate a motor of the architectural covering to change a position of the architectural covering.

In accordance with one aspect of the disclosure, a hub as disclosed herein facilitates the distribution of software instructions to the architectural coverings. In some disclosed examples, the software instructions are distributed from a repository (e.g. a repository that utilizes cloud storage) to the architectural coverings. The software instructions may be firmware updates, software application updates, operational instructions, etc. In some disclosed examples, the software instructions are distributed by the hub that communicates with the repository and the architectural coverings. In some disclosed examples, the hub stores the software instructions at the hub before distributing the software instructions to the architectural coverings. In some disclosed examples, the hub communicates with the architectural coverings via a wireless connection. In some such examples, the wireless connection utilizes a wireless communication protocol that is different from a communication protocol utilized in communicating with the repository. In some disclosed examples, the hub pushes information about software instructions to the architectural coverings by transmitting an advertisement to the architectural coverings, wherein the advertisement identifies information about available software instructions (e.g., version information, device compatibility information, etc.).

In one aspect of the disclosure, the hub serves the software instructions to an architectural covering in response to a request (a pull request) for the software instructions (e.g., the architectural covering may transmit a request to the hub in response to determining that software instructions identified in the advertisement are associated with the architectural covering). In some disclosed examples, the software instructions are transmitted to the architectural covering in chunks that are sized based on an information included in the request. Thus, in some such examples, the software instructions are pulled from the hub by the architectural coverings only when the architectural coverings determine that the software instructions are desired/needed, which may reduce the bandwidth usage that would be associated with the hub pushing the software instructions out to architectural coverings. Furthermore, by allowing the architectural coverings to include transmission parameters (e.g., the sizes to be used for the chunks of the software instructions) in the request, the hub may be utilized with architectural coverings utilizing a variety of communication capabilities (e.g., wired connections, wireless connections, low and high bandwidth connections, etc.).

In accordance with one aspect of the disclosure, the hub communicates with a home control system such as GOOGLE HOME™, AMAZON ALEXA™, APPLE HOMEKIT™, etc. In some disclosed examples, the hub translates an instruction(s) received from the home control system into a command(s) to be transmitted to an architectural covering(s). As used herein, a home control system may be a control system utilized in any type of location such as a house, a business, a public location, an outdoor location, etc. In some disclosed examples, a single instruction is translated into multiple commands transmitted to the architectural covering(s). In some disclosed examples, multiple instructions are translated into a single command transmitted to the architectural covering(s). In some disclosed examples, the hub transmits response information to the home control system in response to the instruction(s) (e.g., information identifying a position of the architectural covering(s)). In some examples, the response information transmitted to the home control system is simulated by the hub when the hub does not have the actual information (e.g., when the hub retrieves position information from the architectural covering(s) at a rate that is less than the rate at which the home control system expects and/or requires a response).

In accordance with one aspect of the disclosure, an environment includes a hub communicatively coupled with a gateway that couples the hub to a repository via a network. For example, the network may be the internet. The hub is also communicatively coupled with one or more architectural coverings. For example, the hub may be coupled to the architectural coverings using wireless communication. The architectural coverings each include control circuitry that operates the respective architectural covering and communicates with the hub. For example, the control circuitry may control a motor to drive movement of an architectural covering.

As mentioned above, in accordance with one aspect of the disclosure, the repository stores software instructions for the architectural coverings. For example, the software instructions may be firmware, software applications, etc. for execution by the control circuitry of the architectural coverings. The hub retrieves the software instructions from the repository. In some such examples, the hub collects identification information from the architectural coverings and transmits the identification information to the repository to retrieve software instructions only for the architectural coverings in communication with the hub. The identification information may include model number, manufacturer information, serial number, and the like and to request software information such as software identification information, software version information, and the like.

In accordance with one aspect of the disclosure, the hub transmits an advertisement to the architectural coverings identifying software instructions that have been retrieved by the hub and are available for distribution to the architectural coverings. In some examples, the advertisement includes information about which architectural coverings are compatible with the software instructions, which version(s) of the software instructions are available, a size of the software instructions, etc. Upon receipt of the advertisement, the circuitry of the architectural covering compares the information contained in the advertisement with the corresponding parameters of the architectural covering to determine if the software instructions are to be retrieved. For example, the circuitry may determine that the software instructions are not to be retrieved if the software instructions are not compatible with the particular architectural covering (e.g., the advertisement information identifies a model number that is different than a model of the architectural covering) and/or if the version of the software instructions is older than a version that is already installed at the architectural covering. Alternatively, the circuitry may determine that the software instructions are to be retrieved when the software instructions are compatible with the architectural covering and the version of the software instructions is newer than a currently installed version. In some examples, a user setting may also be analyzed when determining if the software instructions are to be retrieved. For example, a user setting may indicate if software instruction updates are desired and/or a user may be notified to provide an input to confirm installation when new software instructions are identified.

In accordance with one aspect of the disclosure, when the circuitry determines that software instructions are to be retrieved, the circuitry transmits a request for the software instructions to the hub. In one aspect of the disclosure, the request includes an indication of a chunk size into which the software instructions are to be split. In one aspect of the disclosure, the request also includes an indication of which chunk is requested to be sent by the hub. For example, the request may indicate that the software instructions should be split into chunks of 1 kilobyte each and chunk number 4 is currently requested. In one aspect of the disclosure, the circuitry will transmit requests for each of the chunks until the entirety of the software instructions is received at the architectural covering.

As mentioned above, in one aspect of the disclosure, by retrieving the software instructions with the hub, the architectural coverings do not need to communicate with the repository. Accordingly, the architectural coverings do not need to include network interfaces that facilitate communication with the repository. For example, the architectural coverings may include limited communication hardware that supports communication with the hub but would not support communication with the repository. Additionally, when a hub is in communication with multiple architectural coverings that utilize the same software instructions, the software instructions for the multiple architectural coverings may be downloaded once by the hub and distributed to the multiple architectural coverings to reduce the bandwidth and computing resources that would be associated with multiple downloads by each of the architectural coverings. Furthermore, when the hub stores the software instructions downloaded from the repository, the architectural coverings can retrieve the firmware from the hub even when the hub is no longer in communication with the repository. For example, the hub may be transported to a location that does not provide access to a network and the software instructions may be transmitted to architectural coverings at the location once the architectural coverings establish a connection with the hub.

In some examples, the hub retrieves software from the repository and transmits the software to the architectural coverings without the need for a user to instruct the retrieval and transmission. Alternatively, a user may instruct the operation of the hub. For example, the user may provide instructions via a user interface such as a portable computing device (e.g., a smartphone).

In accordance with some aspects of the disclosure, the hub includes an interface to receive instructions from home control systems. For example, the instructions may be instructions to raise a covering, lower a covering, move a covering to a particular position (e.g., 50% open), power on, power off, etc. In some such examples, the home control systems are devices that can communicate with environmental devices in a home, business, or other building(s). For example, the environmental devices may include lights, thermostats, windows, etc. In some disclosed examples, the home control systems cannot communicate directly with architectural coverings. For example, the home control systems and the architectural coverings may not support compatible communication protocols. Furthermore, the hub and the architectural coverings may not support compatible instruction sets. Thus, the hub operates as a bridge between the home control systems and the architectural coverings to translate both instructions and communication protocols allowing communication between the home control systems and the architectural coverings.

As mentioned above, in accordance with some aspects of the disclosure, the hub generates a simulated response to transmit to the home control system. For example, while the hub may query the position and/or state of an architectural covering, the hub may not determine a position and/or may not determine an operating state of an architectural covering at a time that the home control system expects a response. To provide a response to the home control system, the hub may generate a simulated response to report a position and/or state of an architectural covering. In accordance with some aspects of the disclosure, when a movement of an architectural covering is requested, the hub queries the architectural covering two times separated by a known amount of time to determine a speed based on the change in position over the amount of time. For example, if the architectural covering reports a 75% open position at a first time and reports a 72% open position a second time queried after 2 seconds, the hub determines that the covering is closing at a speed of (75%−72%)/2=1.5% per second. In other examples, any number of measurements may be collected and the speed may be recalculated (e.g., 3, 4, 5, repeated measurement after an increment of time, etc.). In accordance with some aspects of the disclosure, the speed may be determined a first time that an architectural covering is controlled by the hub and may be stored for retrieval and use in simulation during later operations. In other examples, the speed may be calculated each time an architectural covering is operated, may be calculated periodically or aperiodically, or at any other time. In accordance with some aspects of the disclosure, the position of an architectural covering may be reported as a percent open, a percent closed, a distance from open and/or closed, a percent titled, a degree of tilt, etc.

In accordance with some aspects of the disclosure, the hub estimates a position of the covering based on the determined speed and the last known position. In some examples, the last known position is a position that is stored at the hub. In other examples, the last known position is a position determined by querying the architectural covering. In accordance with some aspects of the disclosure, when an architectural covering is commanded by the hub to move to a target position, the hub determines a time at which the target position will be reached using the aforementioned calculation of the speed and determining an amount of time needed to move to the target position based on the speed. At the time estimated for the architectural covering to reach the target position, the hub reports to the home control system that the movement is completed and the architectural covering is stopped. In accordance with some aspects of the disclosure, the hub also queries the state and position of the architectural covering at the estimated time and stores the final position reported by the architectural covering. In accordance with some aspects of the disclosure, if the target position does not match the position returned by the architectural covering and/or the architectural covering reports that it is still moving, the architectural covering reports an exception, an error, an alert, etc. to the home control system.

In accordance with some aspects of the disclosure, a hub may include the above-disclosed capabilities for communicating software instructions to architectural coverings and the above-disclosed capabilities for interoperation with a home control system. In other implementations, the hub may only include the above-mentioned capabilities for communicating software instructions to the architectural coverings. In still other implementations, the hub may only include the above-mentioned capabilities for interoperation with a home control system.

Turning now to the figures, FIG. 1 illustrates an example of an environment 100 including a hub 102, a gateway 104, a network 106, a repository 108, a home control system 110, and architectural coverings 120, 122, and 124. In other examples, environment 100 may include any number of architectural coverings (1, 2, 3, 10, 20, 100, etc.). According to the illustrated example, hub 102 is communicatively coupled to repository 108 via gateway 104 and network 106, hub 102 is communicatively coupled to home control system 110 via gateway 104, and hub 102 is communicatively coupled to architectural coverings 120, 122, and 124.

Hub 102 of the example of FIG. 1 is a microprocessor-based SoC. Alternatively, hub 102 may be implemented by any other type of computing device such as a desktop computer, a laptop computer, a server, an embedded computing device, etc., or any combination of computing devices. An example implementation of hub 102 is described in conjunction with FIG. 2. Processes that may be implemented by hub 102 are described in conjunction with FIGS. 4 and 6.

Gateway 104 communicatively couples hub 102 with network 106 and home control system 110. Gateway 104 may be a modem, a router, a switch, a hub, an access point, or any other network device or combination of devices. For example, gateway 104 may be a modem that includes a router having wired and/or wireless network interfaces for an internet protocol (IP) network(s). In some examples, the hub 102 and the gateway 104 may be integrated in a single device.

Network 106 communicatively couples gateway 104 and repository 108. In some examples, network 106 couples gateway 104 and, thereby, hub 102 with information providers such as time server, remote command servers, etc. Network 106 may be any type of network including a wide area network, a local area network, a wired network, a wireless network, or any combination of networks. According to the illustrated example, network 106 is the Internet.

Repository 108 stores software instructions for distribution to architectural coverings. The software instructions may be firmware, firmware updates, software applications, software application updates, operating systems, operating system updates. etc. Repository 108 may be a cloud storage system. The example repository 108 includes a server to serve the software instructions to hub 102 in response to requests. In some examples, the repository 108 receives an identification of an architectural covering and/or version information and returns the software instructions relevant to the architectural covering and/or software version. A process that may be implemented by repository 108 is described in conjunction with FIG. 3.

Home control system 110 is a controller to control operation of devices within a home, business, or other building or location. For example, home control system 110 may implement GOOGLE HOME™, AMAZON ALEXA™, APPLE HOMEKIT™, etc. Home control system 110 may connect with multiple devices for input and/or control. For example, home control system 110 may receive instructions via a user mobile device.

While environment 100 in the example of FIG. 1 includes the home control system 110, other examples of environment 100 may not include home control system 110. For example, home control system utilization may not be desired, hub 102 may not include an interface to a home control system, etc.

Architectural coverings 120, 122, and 124 are motorized coverings that are controlled by a local controller 130, 132, and 134, respectively. Local controllers 130, 132, and 134 receive command(s) from the hub 102 to control the operation of the motorized architectural coverings 120, 122, and 124. For example, local controller 130, 132, and 134 may receive a command to lower the architectural covering and may operate a motor of the architectural covering to lower the covering. In another example, local controller 130, 132, and 134 may receive a command to tilt the architectural covering and may operate a motor to tilt the covering. In some examples, local controllers 130, 132, and 134 transmit status information and/or responses to the instructions back to hub 102.

Architectural coverings 120, 122, and 124 may be any type of covering that at least partially covers an architectural element such as a window, a door, an opening, a wall, etc. For example, architectural coverings 120, 122, and 124 may be one or more of roller shades, stacking/tiered shades, corded shades, cordless shades, vertical shades, horizontal shades (e.g., Venetian blinds), window shutters, projection screens, or any other motorized covering. Architectural coverings 120, 122, and 124 may include one or more coverings. Architectural coverings 120, 122, and 124 may include the option to raise and lower the covering (or move in any other direction) and/or may include the option to tilt the covering (e.g., tilt slats within the covering).

Architectural coverings 120, 122, and 124 are communicatively coupled with hub 102 via wired and/or wireless communication. According to the illustrated example, architectural coverings 120, 122, and 124 communicate with hub 102 utilizing a wireless communication protocol in the 2.4 MHz spectrum utilizing a command set specific to architectural covering operation. For example, the wireless communication protocol may include a simplified set of instructions that relate to the operation of architectural coverings. In some such examples, the wireless communication protocol may include an Application Programming Interface (API) that supports commanding movement of architectural coverings, receiving requests to provide identification and/or software information, broadcasting identification and/or software information, receiving broadcasts of software availability, retrieving software, etc. Accordingly, the wireless communication may be sufficiently simple to enable local controllers 130, 132, and 134 to be implemented with limited computing resources by eliminating the need to support standard wireless communication protocols (e.g., BLUETOOTH® wireless communication protocol from the Bluetooth Special Interest Group, WI-FI® wireless communication protocol from the Wi-Fi Alliance, etc.) and/or robust protocols such as IP, transmission control protocol (TCP), etc. Alternatively, architectural coverings 120, 122, and 124 may support other wireless communication protocols including BLUETOOTH® wireless communication protocol, BLUETOOTH® low energy (BLE) wireless communication protocol, WI-FI® wireless communication protocol, frequency hopping wireless communication protocols, ZigBee® wireless communication protocol from the ZigBee Alliance, X10 wireless communication protocol, infrared communication protocols, acoustic communication protocols, ethernet protocols, cellular protocols, Z-Wave® wireless communication protocol from Zensys, digital enhanced cordless telecommunications (DECT) wireless communication protocol, powerline communication protocols, universal powerline communication protocols, etc.

Figure 5:
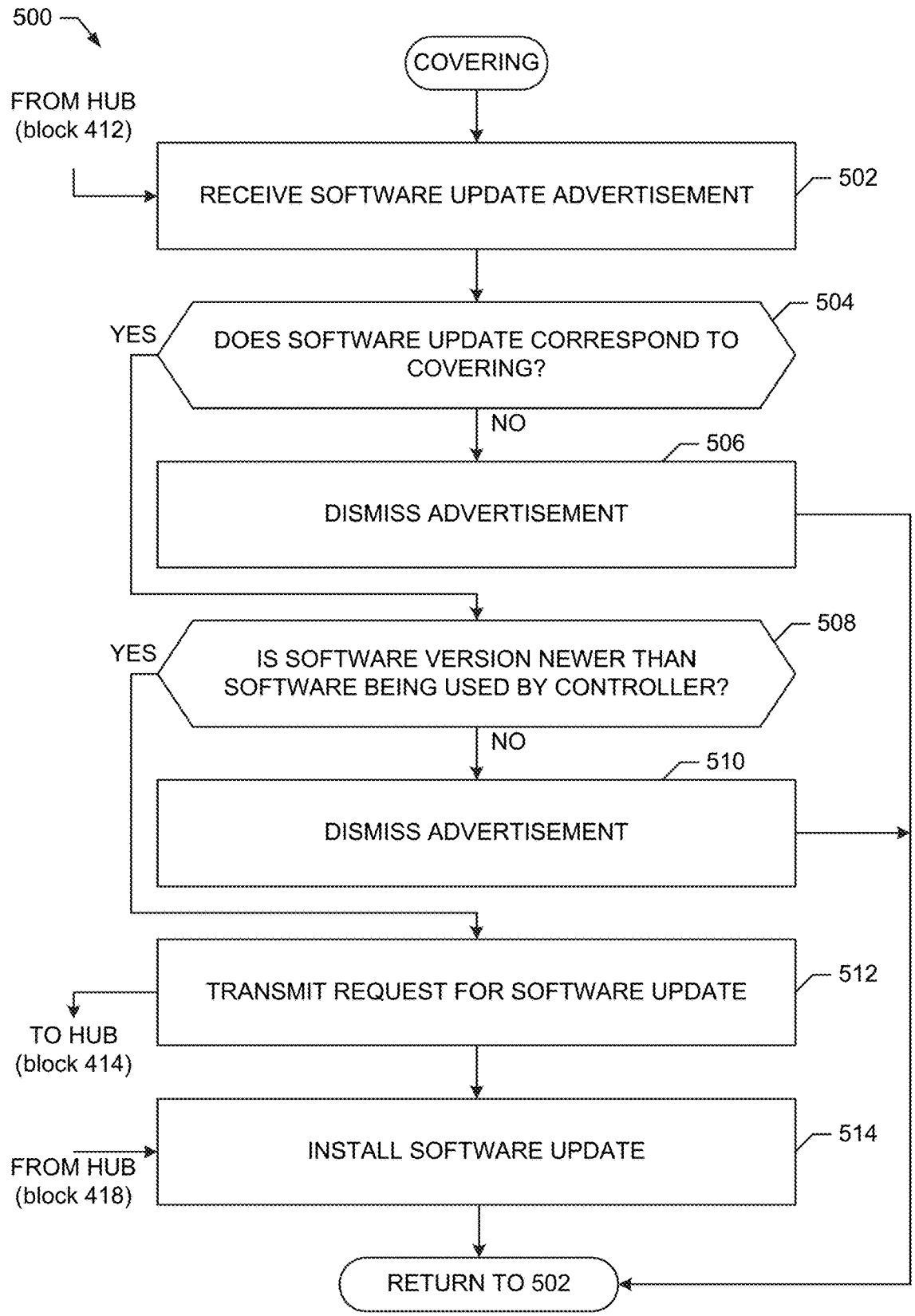

A process that may be implemented by repository 108 to install updated software instructions is described in conjunction with FIG. 5.

In accordance with one aspect of the disclosure, the hub is implemented as a particularly programmed processor such as a system-on-a-chip. In accordance with another aspect of the disclosure, one of more components of the hub may be implemented as separate hardware elements. For example, the hub may include a processor coupled to a first communication device(s) for communicating with the gateway and a second communication device(s) for communicating with the architectural coverings. In some such examples, the hub may also include a coprocessor to support communication with certain external devices (e.g., to perform validation required for communication with certain external devices such as APPLE™ iOS mobile user devices). In some examples, the hub includes user interface elements such as light emitting diode (LED) indicators, buttons, displays, input devices, etc.

Figure 2:
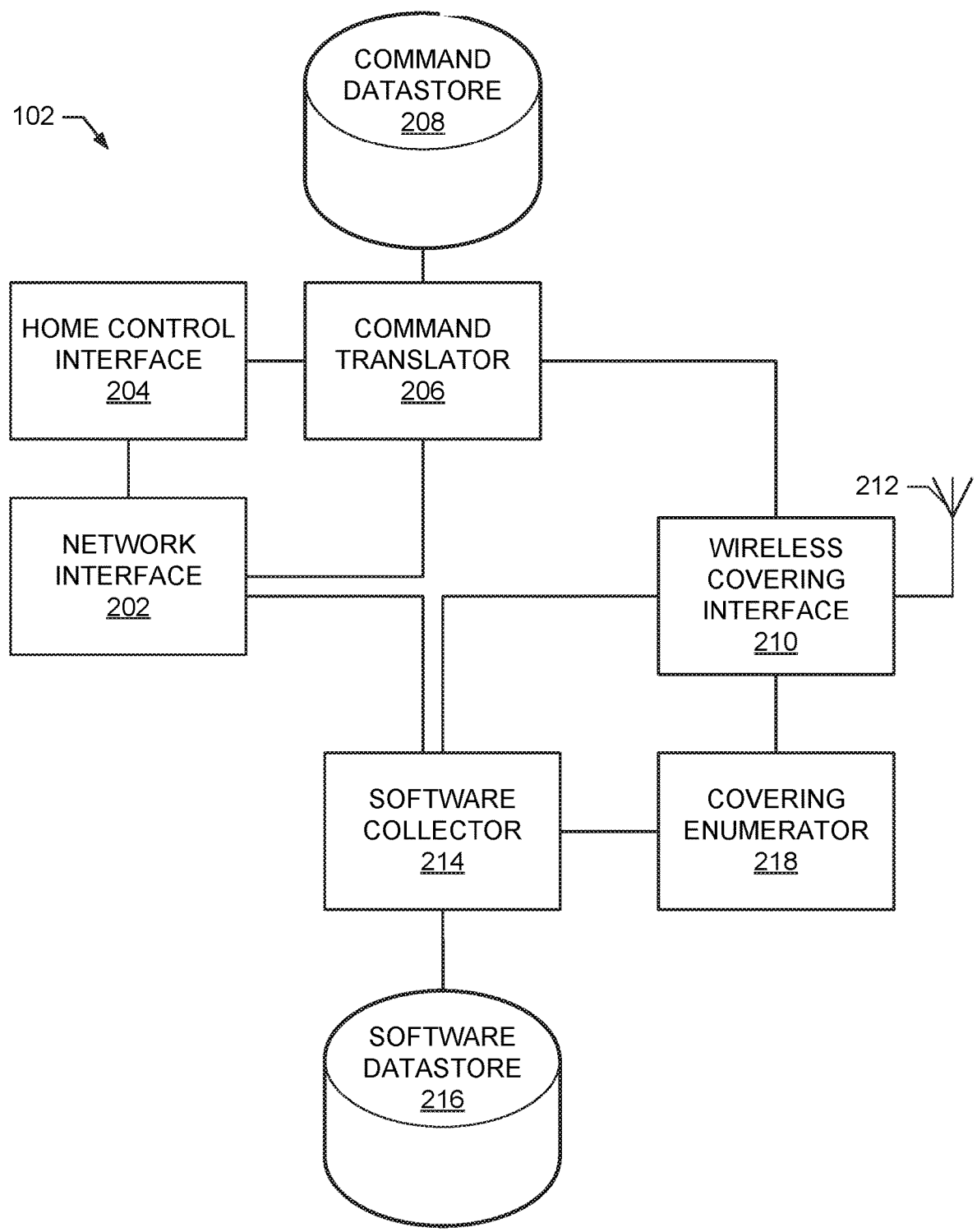
FIG. 2 is a block diagram of an example of an implementation of the hub of FIG. 1.

FIG. 2 is a block diagram of an example of an implementation of hub 102. Hub 102 of FIG. 2 includes a network interface 202, a home control interface 204, a command translator 206, a command datastore 208, a wireless covering interface 210, an antenna 212, a software collector 214, a software datastore 216, and a covering enumerator 218. In some examples, hub 102 may not interface with a home control system and, thus, may not include home control interface 204, command translator 206, and command datastore 208. In some examples, hub 102 may not distribute software instructions to architectural coverings and, thus, may not include software collector 214, software datastore 216, and covering enumerator 218. In some other examples, hub 102 may include covering enumerator 218 to provide information about architectural coverings to home control interface 204 and/or command translator 206.

Network interface 202 communicates with networked devices such as repository 108 and home control system 110 via gateway 104. Additionally or alternatively, networked devices may communicate directly with network interface 202. Network interface 202 includes a wired interface to communicate with wired networks and devices and a wireless interface to communicate with wireless interfaces and devices. Network interface 202 may connect to a network by obtaining an IP address for use in communicating with devices connected to the network. Data received by network interface 202 is transmitted to home control interface 204 and software collector 214.

Home control interface 204 implements an application programming interface (API) to communicate with home control system 110 or other home control devices via network interface 202. Home control interface 204 transmits received instructions to command translator 206. In systems and/or events in which responses to instructions are received from architectural coverings 120, 122, and 124, home control interface 204 receives such responses from command translator 206 and transmits them to home control system 110 via network interface 202. In systems and/or events in which home control system 110 expects a response to instructions, but architectural coverings 120, 122, and 124 do not send a response, do not send a response at a rate requested by home control system 110, and/or do not provide all information requested by home control system 110, home control interface 204 may receive a simulated response from command translator 206 and may be transmit the simulated response to home control system 110 via network interface 202. For example, command translator 206 may transmit an estimated position calculated based on an estimated operating speed and an operating state (e.g., running) to home control interface 204.

Command translator 206 facilitates intercommunication between home control system 110 and architectural coverings 120, 122, and 124 in an environment in which the instruction set/command set of the home control system 110 and architectural coverings 120, 122, and 124 are not compatible and/or are otherwise not the same. To translate communications, command translator 206 interfaces with command datastore 208 that stores rules, expressions, instructions, definitions, and the like that define how to translate communications between home control system 110 and architectural coverings 120, 122, and 124. For example, command datastore 208 may indicate that an instruction from home control system 110 is to be translated to a particular command for architectural coverings 120, 122, and 124, and/or may indicate that an instruction from home control system 110 is to be translated to multiple commands for architectural coverings 120, 122, and 124, and/or may indicate that home control system 110 expects a response to an instruction, and/or that architectural coverings 120, 122, and 124 will not generate a response or a response will not be available to indicate that command translator 206 is to generate a simulated response, etc.

In some examples, hub 102 may interface and/or be capable of interfacing with multiple different home control systems (e.g., home control systems provided by multiple manufacturers). In such examples, datastore 208 may store rules, expressions, instructions, definitions, and the like that define how to translate communications from the multiple different home control systems. For example, a first instruction from a first home control system and a second, different, instruction from a second home control system may be translated to the same command for the architectural covering. In some examples, the multiple home control systems each include their own datastores, support their own encryption and decryption protocols, application programming interfaces, etc. The datastores of the home control systems may store measurement data to support the home control systems.

Command translator 206 transmits commands to wireless covering interface 210 for transmission to architectural coverings 120, 122, and 124. Command translator 206 also receives responses, if sent, from architectural coverings 120, 122, and 124 via wireless covering interface 210. Command translator 206 transmits received responses to home control system 110 via home control interface 204. If information stored in command datastore 208 indicates that home control system 110 expects a response in reply to a transmitted instruction and indicates that architectural coverings 120, 122, and 124 do not transmit responses or responses are not requested at a fast enough rate, command translator 206 generates a simulated response. For example, command translator 206 may generate a default response, and/or may generate a response based on an estimate (e.g., by estimating the position of a covering or estimating a status of a covering), and so forth. For example, to reduce bandwidth, reduce utilization of computing resources at architectural coverings 120, 122, and 124, and/or reduce battery usage at architectural coverings 120, 122, and 124, command translator 206 may not request the current position of a covering at a rate that matches a rate requested by home control system 110. For example, home control system 110 may request that a covering position be reported every second during movement of the covering, but in some aspects of the disclosure, command translator 206 may query the covering position only two times during a movement. Accordingly, command translator 206 determines a speed at which the covering is moving by dividing the distance travelled between the two measurements by the time that elapses between the two measurements. Command translator 206 determines a current position of the covering at any time by determining the distance that the covering has travelled since the last determined position (e.g., last position reported during a query of the architectural covering, last known position retrieved from storage, last estimated position, etc.) based on the estimated speed and the time that has elapsed. Additionally, command translator 206 reports to home control interface 204 that covering has reached a target position when the time for the covering to reach the target position from a current position based on the estimated speed has elapsed.

Wireless covering interface 210 communicates wirelessly with architectural coverings 120, 122, and 124 via antenna 212. In some other examples, antenna 212 may be integrated in the wireless covering interface 210 (e.g., may not be an external antenna). In some examples, antenna 212 may be removably connected to wireless covering interface 210. In some examples, hub 102 may not include antenna 212. For example, antenna 212 may be replaced by an infrared emitter to emit infrared communications, a speaker to emit acoustic communications, etc. According to the illustrated example, wireless covering interface 210 utilizes a simplified wireless communication protocol that does not use IP or transmission control protocol (TCP) to send/receive a limited set of instructions for controlling operation and updating of architectural coverings 120, 122, and 124. Wireless covering interface 210 communicates within the 2.4 MHz radio frequency spectrum. For example, wireless covering interface 210 may utilize a proprietary communication protocol that is designed for communicating with architectural coverings 120, 122, and 124. Alternatively, hub 102 may utilize any type of communication interface(s) for communicating with architectural coverings 120, 122, and 124.

Software collector 214 communicates with repository 108 via network interface 202 to identify and retrieve software instructions for storage in software datastore 216 and distribution to architectural coverings 120, 122, and 124 via wireless covering interface 210. Software collector 214 determines identification information and software information for architectural coverings 120, 122, and 124 from covering enumerator 218. Software collector 214 also communicates with architectural coverings 120, 122, and 124 via Covering enumerator 218 determines identification and software information for architectural coverings 120, 122, and 124 via wireless covering interface 210. For example, covering enumerator 218 may broadcast a request, a query, and/or any other type of polling for architectural coverings 120, 122, and 124 to identify themselves and identify software information, and/or architectural coverings 120, 122, and 124 may broadcast identification information and/or software information that is received by covering enumerator 218, and/or architectural coverings 120, 122, and 124 may detect the presence of hub 102 and transmit identification information and software information to covering enumerator 218, etc. The identification information collected by covering enumerator 218 may include model number, manufacturer information, serial number, and the like. The software information collected by covering enumerator 218 may include software identification information, software version information, information about supported communication protocols, information about support commands, and the like.

Command datastore 208 and software datastore 216 in the example of FIG. 2 are flash storage. Alternatively, command datastore 208 and/or software datastore 216 may be any type of storage such as, for example, a database, a file, a cache, a buffer, etc.

While an example manner of implementing hub 102 of FIG. 1 is illustrated in FIG. 2, one or more of the elements, processes and/or devices illustrated in FIG. 2 may be combined, divided, re-arranged, omitted, eliminated and/or implemented in any other way. Further, network interface 202, home control interface 204, command translator 206, wireless covering interface 210, software collector 214, covering enumerator 218, and/or, more generally, example hub 102 of FIG. 1 may be implemented by hardware, software, firmware and/or any combination of hardware, software and/or firmware. Thus, for example, any of network interface 202, home control interface 204, command translator 206, wireless covering interface 210, software collector 214, covering enumerator 218, and/or, more generally, example hub 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of network interface 202, home control interface 204, command translator 206, wireless covering interface 210, software collector 214, and/or covering enumerator 218 is/are hereby expressly defined to include a non-transitory computer readable storage device or storage disk such as a memory, a digital versatile disk (DVD), a compact disk (CD), a Blu-ray disk, etc. including the software and/or firmware. Further still, hub 102 of FIG. 1 may include one or more elements, processes and/or devices in addition to, or instead of, those illustrated in FIG. 2, and/or may include more than one of any or all of the illustrated elements, processes and devices.

Flowcharts representative of example machine readable instructions for implementing environment 100 including hub 102, repository 108, and controllers 130, 132, 134 of architectural coverings 120, 122, and 124 of FIGS. 1 and/or 2 are shown in FIGS. 3-7. In the examples of FIGS. 3-7, the machine readable instructions comprise a program for execution by a processor such as processor 812 shown in example processor platform 800 discussed below in connection with FIG. 3-7. The program may be embodied in software stored on a non-transitory computer readable storage medium such as a memory associated with processor 812, a CD-ROM, a floppy disk, a hard drive, a digital versatile disk (DVD), or a Blu-ray disk, but the entire program and/or parts thereof could alternatively be executed by a device other than processor 812 and/or embodied in firmware or dedicated hardware. Further, although the example program is described with reference to the flowchart illustrated in FIG. 2, many other methods of implementing hub 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 3:
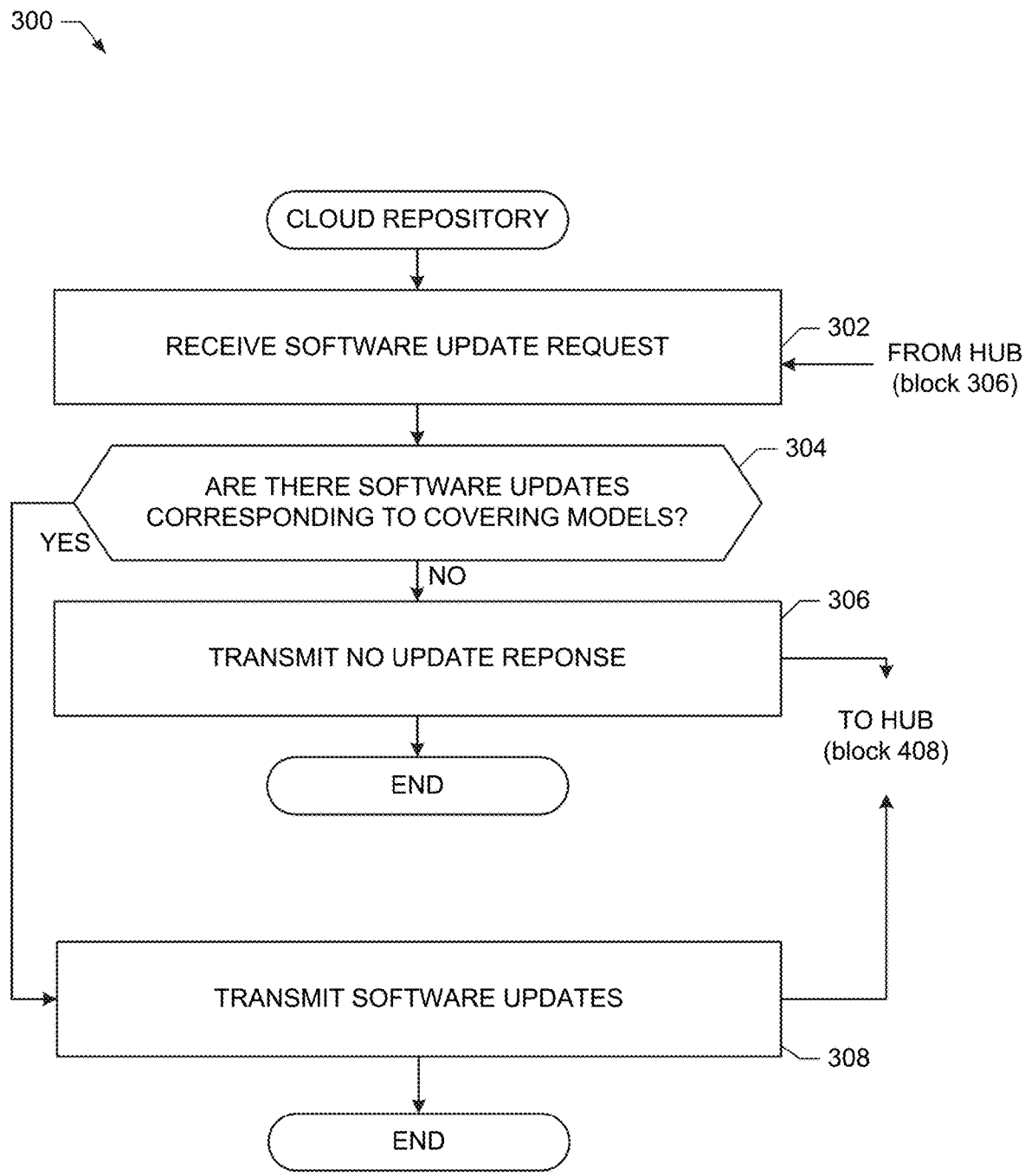
FIG. 3 is a flowchart representative of example machine readable instructions that may be executed to implement the repository of FIG. 1.
Figure 4:
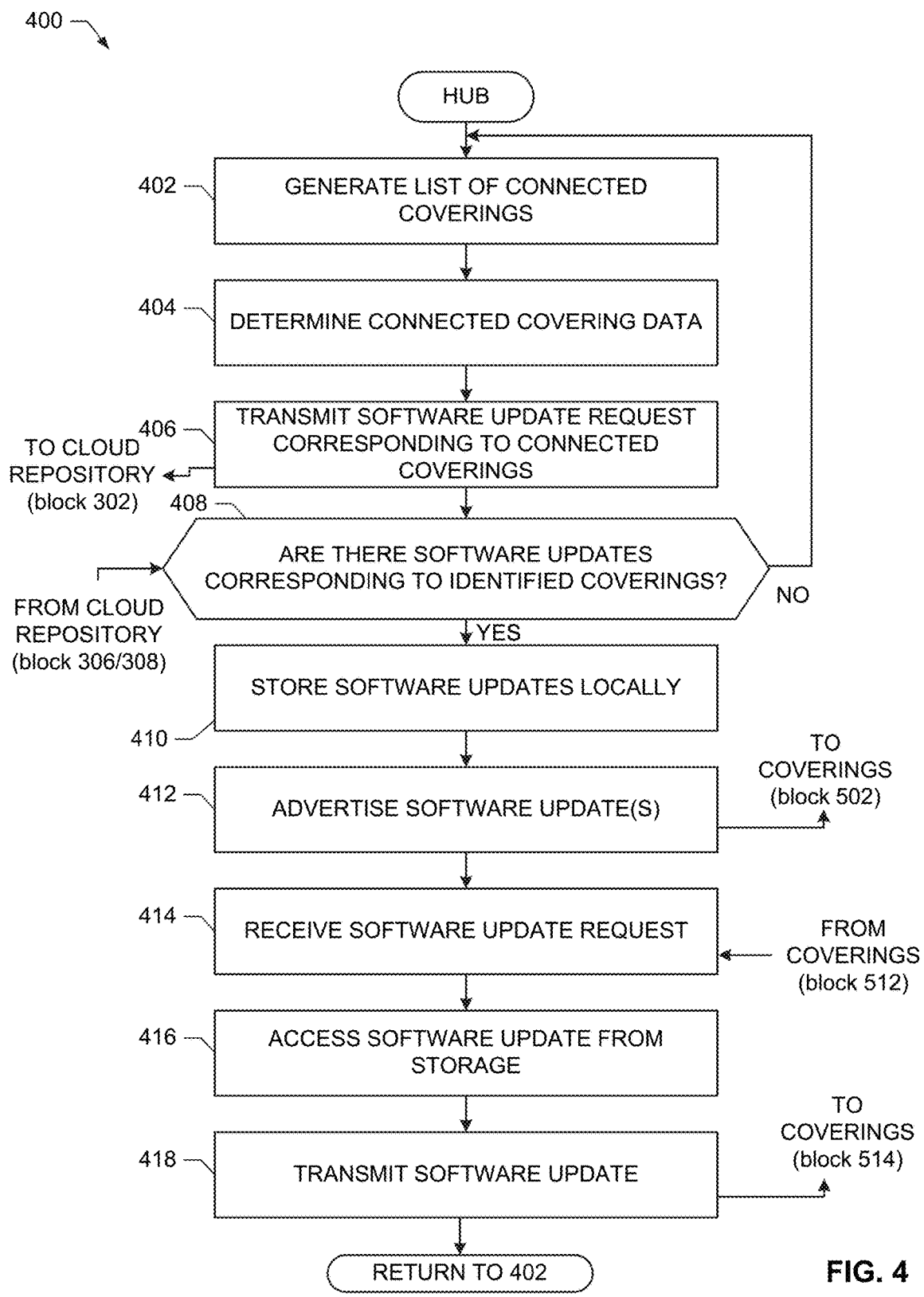
FIGS. 4-7 are flowcharts representative of example machine readable instructions for implementing the environment of FIG. 1.

The flowcharts of FIGS. 3-5 illustrate a process in which repository 108, hub 102, and controllers 130, 132, and 134 communicate to transfer software instructions stored at repository 108 to controllers 130, 132, and 134 for installation.

Program 300 of FIG. 3 begins when repository 108 receives a software request from hub 102 (block 302). The software request includes an identification of the architectural coverings 120, 122, and 124 and information about software at the architectural coverings 120, 122, and 124. Repository 108 determines if it has any software instructions for the identified architectural coverings 120, 122, and 124 (block 304). For example, repository 108 may determine if it has stored any software instructions associated with the architectural coverings 120, 122, and 124 that have a newer version than the version identified in the request from the hub. When repository 108 does not have any updates, repository 108 transmits a response to hub 102 indicating that there are no updates (block 306). Alternatively, repository 108 may not transmit a response when there are no updates. When repository 108 has updates, repository 108 transmits the updates to hub 102 (block 308). Alternatively, repository 108 may transmit an indication of the updates and/or a notification of the updates and/or a location at which the updates may be retrieved, etc. and the hub 102 may later retrieve the updates. After transmitting a response to hub 102 (block 306 or block 308), the program of FIG. 3 ends.

FIG. 4 is a flowchart representative of instructions that may executed by a processor to implement hub 102 to interact with repository 108 operating according to FIG. 3. FIG. 4 is described with reference to the examples of FIGS. 1 and 2. Alternatively other implementations of environment 100 and/or hub 102 may be utilized in conjunction with the processes illustrated in FIG. 4.

Program 400 of FIG. 4 begins when covering enumerator 218 generates a list of architectural coverings 120, 122, and 124 that are communicatively coupled with hub 102 via wireless covering interface 210 and antenna 212 (block 402). Covering enumerator 218 determines data about connected architectural coverings 120, 122, and 124 (block 404). For example, the data may include identification information and software information for architectural coverings 120, 122, and 124.

Software collector 214 transmits a software update request corresponding to connected architectural coverings 120, 122, and 124 to repository 108 via network interface 202 (block 406). The software update request includes the data collected about connected architectural coverings 120, 122, and 124 by covering enumerator 218. Software collector 214 determines if repository 108 has responded with software updates (block 408). If there are no software updates, control returns to block 402 to continue monitoring for updates. For example, hub 102 may check for new updates periodically and/or aperiodically (e.g., daily, weekly, monthly, upon detection of a newly connected architectural covering, upon user initiation, and/or any combination of these events).

When repository 108 responds with software update(s) (block 408), software collector 214 stores the software updates in software datastore 216 (block 410). Software collector 214 transmits, via wireless covering interface 210, an advertisement of the software updates to architectural coverings 120, 122, and 124 to which the software updates apply (block 412). For example, software collector 214 may only advertise to ones of architectural coverings 120, 122, and 124 that utilize the retrieved software and for which the software update would be an update (e.g., a newer version). Alternatively, software collector 214 may broadcast or otherwise transmit an advertisement to all connected architectural coverings 120, 122, and 124 to let architectural coverings 120, 122, and 124 decide which software updates to retrieve from hub 102. The advertisement includes an identification of architectural coverings compatible with the software, a version of the software, and a size of the software.

After transmitting the advertisement (block 412), software collector 214 receives a software update request from one or more of architectural coverings 120, 122, and 124 (block 414). For example, software collector 214 may operate as a server from which architectural coverings 120, 122, and 124 may request and retrieve software updates identified in advertisements. Software collector 214 accesses datastore 216 to retrieve the requested software update(s) (block 416) and transmit the requested update(s) to architectural coverings 120, 122, and 124 via wireless covering interface 210 and antenna 212 (block 418). In the illustrated example, the request identifies a size of chunks into which the software is to be divided and identifies a chunk to be transmitted. The software collector 214 divides the software into chunks identified by the size and transmits the requested chunk. The architectural coverings 120, 122, and 124 will transmit requests for each chunk until the full software is received successfully. Control returns to block 402 to continue monitoring for further software updates as described in conjunction with block 408. Additionally or alternatively, hub 102 may continue receiving software updates requests at block 414.

In some examples, hub 102 may transmit software updates in the advertisement so that the architectural coverings do not need to request/retrieve the updates. Alternatively, in some examples, hub 102 may not transmit advertisements (e.g., architectural coverings may poll hub 102 to determine if any updates are available and, in response, may download available updates from hub 102).

FIG. 5 is a flowchart representative of instructions that may executed by a processor to implement controller 130, 132, and 134 of architectural coverings 120, 122, and 124 to interact with hub 102 according to FIG. 4. FIG. 5 is described with reference to the examples of FIGS. 1 and 2. Alternatively other implementations of environment 100 and/or hub 102 may be utilized in conjunction with the processes illustrated in FIG. 5.

Program 500 of FIG. 5 begins when controller 130, 132, and 134 receives a software update advertisement from hub 102 (block 502). Controller 130, 132, and 134 determines if the advertised software update corresponds to the respective covering (block 504). For example, controller 130, 132, and 134 determines if the software update is compatible with controller 130, 132, and 134, respectively, and architectural coverings 120, 122, and 124, respectively. Controller 130, 132, and 134 also determines if a version of the software update is newer than a version of corresponding software already installed at controller 130, 132, and 134. Controller 130, 132, and 134 may additionally determine if the software update is to be installed by checking with a user setting (e.g., a setting that indicates if software updates should be automatically installed). When the software update does not correspond to the respective controller 130, 132, and 134, controller 130, 132, and 134 dismisses the advertisement (block 506) and control returns to block 502 to await the next software update advertisement.

When the software update corresponds to the respective controller 130, 132, and 134 (block 504), controller 130, 132, and 134 determines if a version of the software update is newer than a version of corresponding software already installed at controller 130, 132, and 134 (block 508). Controller 130, 132, and 134 may additionally determine if a software update is to be installed by checking with a user setting (e.g., a setting that indicates if software updates should be automatically installed). When the software update is not newer, controller 130, 132, and 134 dismisses the advertisement (block 510) and control returns to block 502 to await the next software update advertisement.

When the software update is newer (block 408), controller 130, 132, and 134 transmits a request for the software update to hub 102 (block 512). In the illustrated example, controller 130, 132, and 134 identifies a size of chunks into which the software is to be divided for transmission and identifies a particular chunk that is requested for transmission. In such an example, block 512 is requested until all chunks are requested and received by controller 130, 132, and 134. For example, controller 130, 132, and 134 may determine the number of chunks based on the chunk size and the size of the software reported in the software advertisement. Thus, according to the example of FIG. 5, controller 130, 132, and 134 pulls the update from hub 102 rather than hub 102 pushing the update to controller 130, 132, and 134. Utilizing a pull approach may reduce the computing resources consumed by hub 102 as compared with a push approach. In addition, the pull approach enables controller 130, 132, and 134 to control when and if software updates are retrieved (e.g., software updates may be pulled/retrieved at a time in which architectural covering 120, 122, and 124 are not expected to be utilized). In response to receiving the software update, controller 130, 132, and 134 installs the received software update (block 514). Control then returns to block 502 to await the next software update advertisement.

Figure 7:
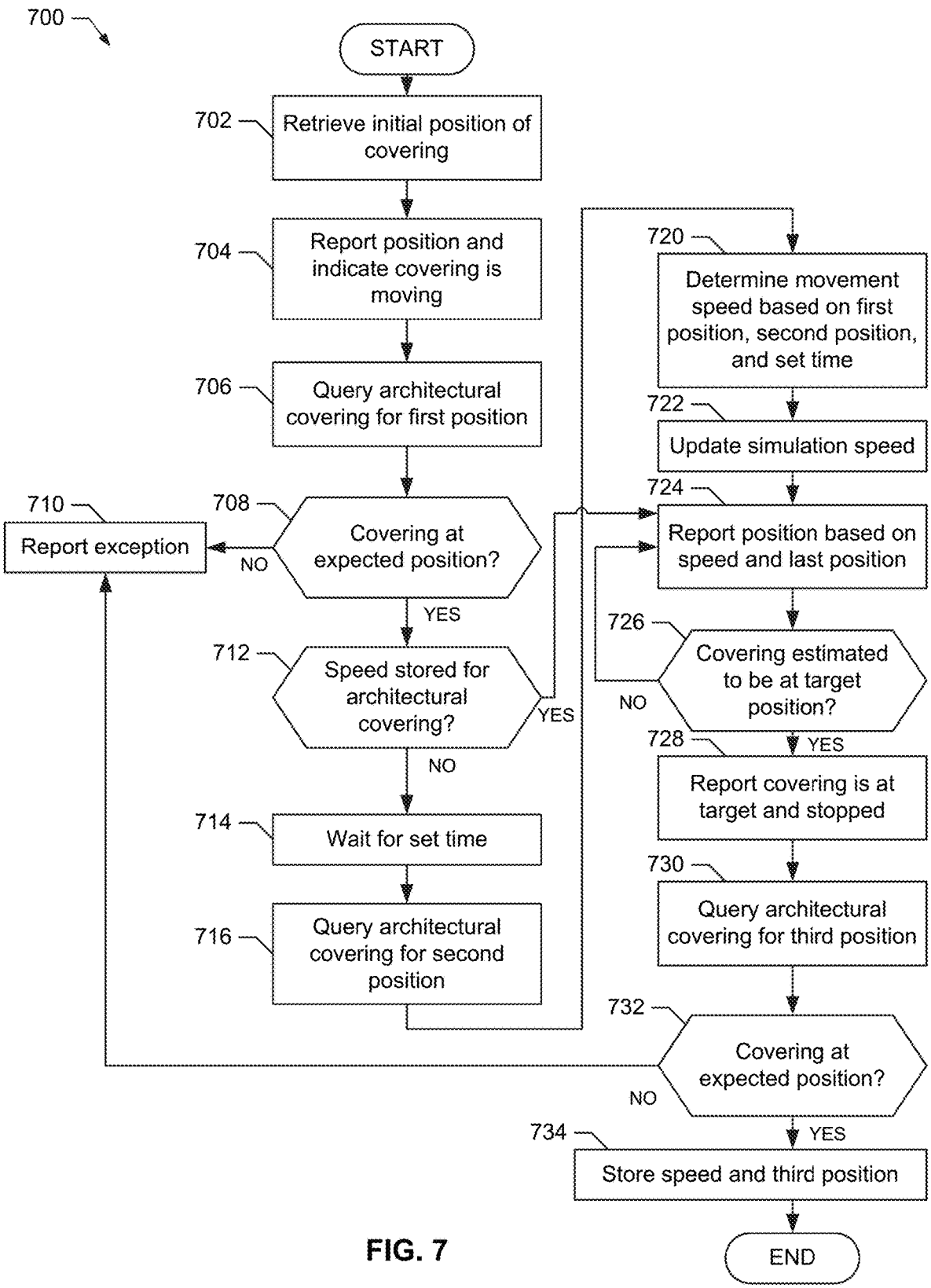

In some aspects of the disclosure, the hub may translate one or more instructions from a home control system into one or more commands to operate an architectural covering. For example, an instruction to open a covering of an architectural covering may be translated into a command to move in a particular direction to a target position. In another example, an instruction from the home control system may be translated to the hub starting a task, a batch of commands, or any other collection of commands and/or activites. For example, the hub may translate an instruction from the home control system to move a covering to a targeted position into a trigger to perform a task that includes one or more of sending a command to the covering to start movement, querying the architectural covering to determine position information to determine a speed of the covering, reporting the position of the covering and the operating state one or more times to the home control system during the movement, notifying the home control system when movement of the covering has stopped or is estimated to have stopped, etc. For example, FIG. 7 illustrates an example process that may be triggered during an instruction from a home control system to move a covering, the process may be performed to generate and send simulated response information during movement of a covering.

Figure 6:
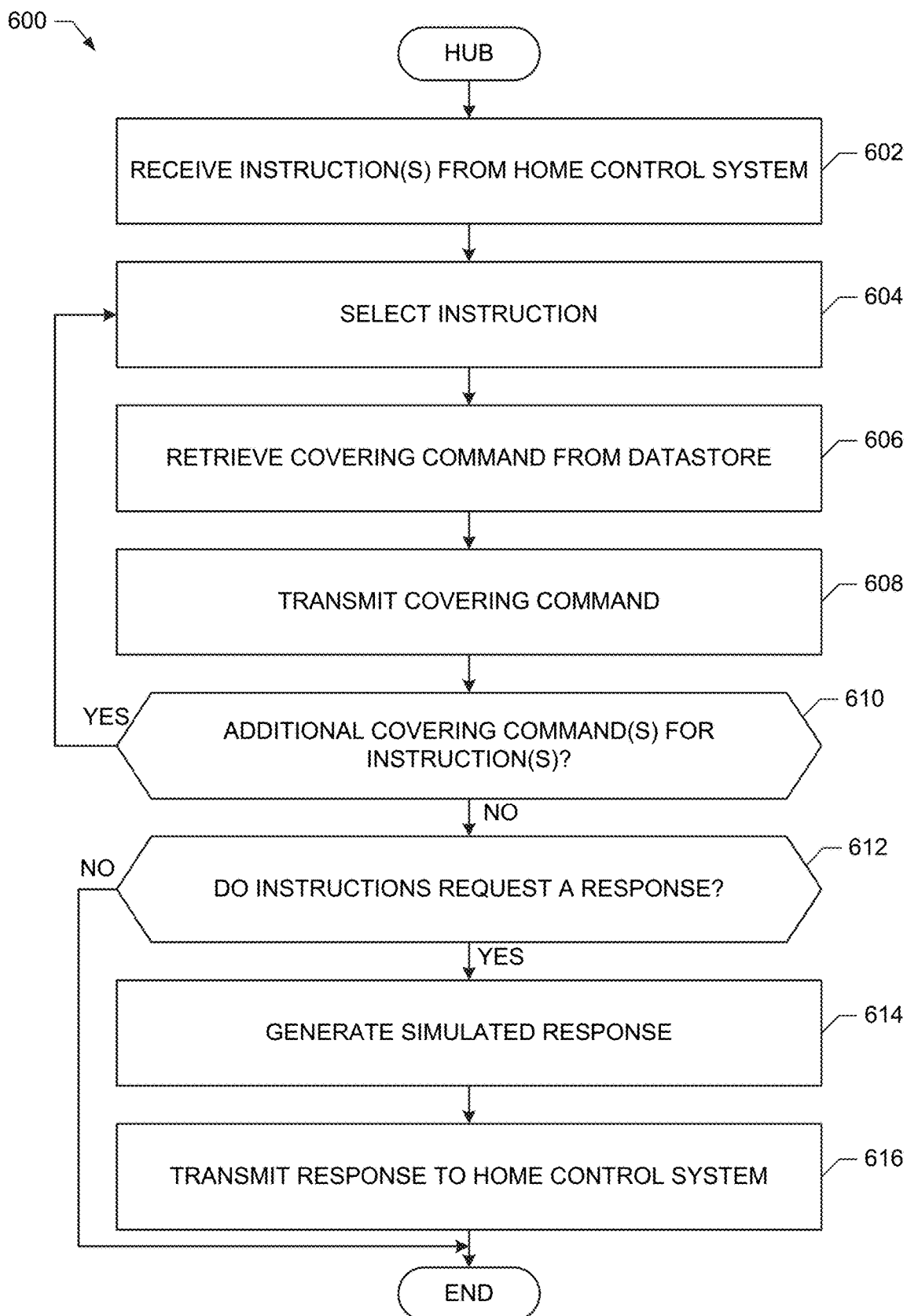

FIG. 6 is a flowchart representative of instructions that may executed by a processor to interface hub 102 with home control system 110. FIG. 6 is described with reference to the examples illustrated in FIGS. 1 and 2. Alternatively other implementations of environment 100 and/or hub 102 may be utilized in conjunction with the processes illustrated in FIG. 6.

Program 600 of FIG. 6 begins when home control interface 204 receives an instruction(s) from home control system 110 via network interface 202 (block 602). Command translator 206 selects a first instruction (block 604) and retrieves a corresponding covering command(s) from command datastore 208 (block 606). The retrieved command(s) is recognized by controller 130, 132, and 134 of architectural coverings 120, 122, and 124 even if the instruction(s) received from home control system 110 are not understood by controller 130, 132, and 134. Command translator 206 transmits the retrieve command(s) to controller 130, 132, and 134 via wireless covering interface 210 (block 608). If the received instruction(s) identify a particular one and/or subset of the architectural coverings 120, 122, and 124, command translator 206 transmits the associated command(s) to the identified one and/or subset.

After transmitting the covering command(s) (block 608), command translator 206 determines if there are additional instruction(s) to be processed (block 610). When there are additional instruction(s) to be processed, control returns to block 604 to select and process the next instruction(s).

When there are no additional instruction(s) to be processed (block 610), command translator 206 determines if the received instruction(s) request a response (block 612). In the illustrated example, architectural coverings 120, 122, and 124 do not transmit responses to hub 102 (e.g., do not report operating status, do not report covering position, etc.). To satisfy the request of the instruction(s) for a response, command translator 206 generates a simulated response (block 614). For example, the simulated response may estimate a position of the covering and/or may indicate that the instruction was processed successfully and the request operation has completed and/or may generate simulated position information (e.g., a single position and/or multiple positions to simulated the procession of movement of the covering), etc. An example process for generating a simulated response is described in conjunction with FIG. 7. Home control interface 204 transmits the simulated response to home control system 110 via home network interface 202 (block 616). After transmitting the response, the program of FIG. 6 ends. Alternatively, control may return to block 614 to generate and transmit a plurality of responses (e.g., to simulate the movement of a covering).

While FIG. 6 illustrates that blocks 612-616 are performed after blocks 602-610, some or all of the block may be performed in parallel. For example, after transmitting a first command to architectural coverings 120, 122, and 124, command translator 206 may begin handling responses to the first command while continuing to process further instructions received from home control system 110.

While the example program 600 illustrated in FIG. 6 includes transmitting a single command at block 608 and transmitting a single response to the home control system in block 616, implementations of hubs in accordance with the principles of the invention disclosed herein may transmit any number, combination, and order of commands, responses, and notifications. For example, when initiating movement (e.g., raising or lowering a covering, tilting a covering, etc.), a home control system may send an instruction to the hub. The hub may respond with an indication that the position of the covering is the last position known to the hub and that the covering is moving prior to transmitting a command to the covering to initiate movement. Alternatively, the hub may transmit the command before transmitting the response. Likewise, the hub may query the architectural covering to determine a position and/or operating state of the covering prior to transmitting a response to the home control system indicating the position and/or operating state of the covering. Any number of responses may be interposed between commands and any number of commands may be interposed between responses. In accordance with the principles of the invention disclosed herein, the timing of transmitting responses to the home control system may dictated by a protocol associated with the home control system. For example, the home control system protocol may indicate that a response must be transmitted upon the hub receiving an instruction from the home control system and/or must be transmitted periodically during a movement of the covering. In some examples, the home control system protocol may indicate that a notification must be transmitted when movement of the covering stops.

As mentioned above and set forth by example in FIG. 7, any number of the responses may be sent to the home control system may be satisfied using simulated information. In accordance with some aspects of the disclosure, some responses may be satisfied using information queried from the architectural coverings (e.g., a position determined by querying the architectural covering) and some responses may be satisfied using information that is estimated. Utilizing estimated responses reduces the resource utilization of the architectural coverings by reducing the number of queries that are performed while still satisfying the home control system protocol. For example, if the home control system protocol indicates that the hub is to report a position of the covering every two seconds during movement of the covering, the hub may estimate one or more of the positions instead of querying the architectural covering for the position at the time that each response is transmitted. In accordance with some aspects of the disclosure, the hub retrieves a stored movement speed for an architectural covering to be moved and/or determines a movement speed for the architectural covering by querying the covering for one or more positions during a movement to determine a change in position over time.

FIG. 7 is a flowchart representative of instructions that may executed by a processor to generate a simulated response to be provided to home control interface 204 to be provided to home control system 110. FIG. 7 is described with reference to the examples illustrated in FIGS. 1 and 2. Alternatively other implementations of environment 100 and/or hub 102 may be utilized in conjunction with the processes illustrated in FIG. 7.

Program 700 of FIG. 6 begins when hub 102 has been commanded by home control system 110 to operate, for example, architectural covering 120. Command translator 206 determines an initial position of architectural covering 120 from command datastore 208 (block 702). For example, command translator 206 may retrieve a position that was stored in command datastore 208 after previously determining a final position due to a prior movement of architectural covering 120. Alternatively, command translator may query architectural covering 120 for the initial position of architectural covering 120 via wireless covering interface 210.

According to the illustrated example, command(s) are sent to architectural covering 120 to start movement of architectural covering 120 at block 608, prior to beginning the program 700 of FIG. 7. Alternatively, in accordance with the principles of the invention, the command(s) to start movement may be transmitted after block 702 of FIG. 7. For example, a command may be transmitted to architectural covering 120 to initiate movement to a target position based on a target identified in the instruction(s) from home control system 110.

Command translator 206 transmits the current position and an indication that the covering is moving to home control system 110 via home control interface 204 (block 704). In accordance with some aspects disclosed herein, the position and movement are reported upon movement being instructed (e.g., prior to querying the position of the covering) to more quickly report the position and operating state to home control system 110.

According to the illustrated example, after reporting the initial position and movement (block 704), command translator 206 queries, via wireless covering interface 210, architectural covering 120 to request a first position of the covering (block 706). For example, command translator 206 may wait a period of time (e.g., 1 second, 2 seconds, 10 seconds, etc.) for the covering to have begun movement and then query architectural covering 120 for the first position. Command translator 206 determines if the response to the query indicates that the covering is at an expected position (block 708). For example, command translator 206 may compare the first position with the initial position to determine if the covering is moving. Alternatively, command translator 206 may utilize a previously determined speed of the covering to determine an expected position based on the retrieved position and a time elapsed between movement being instructed and retrieval of the first position in block 706.

When the covering is not at an expected position (e.g., is not moving) (block 708), command translator 206 reports an exception to home control system 110 via home control interface 204 (block 710). For example, an exception may be an alert, a warning, an error, etc.

When the covering is at an expected position (block 708), command translator 206 determines if a movement speed has been previously stored for architectural covering 120 (block 712). For example, command translator 206 may access command datastore 208 to determine if a speed is stored in association with an identification of architectural covering 120. The identification may be a serial number or other unique identifier of the covering in examples in which the speed is stored for the particular architectural covering. In other examples, the identification may be a model number or other identification associated with a type, model, covering length, or other group of coverings that are expected to operate at the same speed and, thus, the same speed may be estimated for all coverings in the group. In accordance with principles of the invention disclosed herein, a stored speed may be discarded and/or recalculated based on aging (e.g., recalculated every six months), based on a number of times the speed was calculated (e.g., a speed may be recalculated for a threshold number of movements and, for example, averaged until it is validated), etc. When a speed has previously been determined and/or stored for architectural covering 120, control proceeds to block 724 to utilize the speed in reporting the position of the covering.

When a speed has not been previously determined for a covering (or the speed is otherwise determined to be recalculated), command translator 206 waits a set amount of time (block 714). According to the illustrated example, command translator 206 waits 5 seconds. Alternatively, any other time may be utilized such as 1 second, 2 second, 10 seconds, 30 seconds, etc. Command translator 206 then queries architectural covering 120 for a second position (block 716).

Command translator 206 determines a movement speed based on the first position, the second position, and the set time (block 720). According to the illustrated example, command translator 206 subtracts the first position from the first position and divides the result by the set time to determine a rate of movement of architectural covering 120. Command translator 206 stores the speed to update the simulation utilized for the covering (block 722). For example, command translator 206 may store the speed in the command datastore 208 in a record that associates the speed with an identification of architectural covering 120.

Command translator 206 then reports the current position of architectural covering 120 to home control system 110 via home control interface 204 (block 724). For example, command translator 206 determines the position by tracking an amount of time elapsed since a last known position (e.g., the second position) and determines the current position by multiplying the elapsed time by the rate and adding to or subtracting from (depending on the direction of movement) the last known position.

Command translator 206 then determines if the covering is estimated to be at the target position (block 726). Command translator 206 determines if architectural covering 120 is at the target position by comparing the requested target position (e.g., sent in a command from home control system 110) with an estimated position (e.g., a position determined by the speed of movement and a last known position). If the architectural covering 120 is not at the target position, control returns to block 724 to continue updating home control system 110 with updated position information. For example, the position information may be reported at a rate dictated by home control system 110. Accordingly, command translator 206 may continue to report a position of architectural covering 120 during movement of architectural covering 120.

For example, home control system 110 may present an animated user interface illustrating the ongoing movement and position of architectural covering 120. While example program 700 transmits the position after blocks 716, 722, and 726, the command translator 206 may report a position at any time prior to, during, and/or after running a simulation of architectural covering 120. For example, command translator 206 may transmit a position of architectural covering 120 in response to each query of the position of the covering (e.g., after block 702, after block 706, after block 716, and/or after block 730).

When architectural covering 120 is at the target position (block 726), command translator 206 sends a notification to home control system 110 via home control interface 204 (block 728). The notification is a report indicating that the covering has stopped moving and the position is the target position. Command translator 206 then queries architectural covering 120 to determine a third position (block 730).

According to the illustrated example, the third position is a final position at which architectural covering 120 has stopped following the movement. Command translator determines if the third position is an expected position for architectural covering 120 (block 732). For example, command translator 206 may determine if the third position is the target position requested by home control system 110 for the movement. Command translator 206 may also determine if architectural covering 120 indicates that movement has stopped as expected once architectural covering 120 reaches the target position. When the third position is not the expected position, control returns to block 710 to report an exception to home control system 110. When the third position is the expected position, command translator 206 stores the determined speed and the third position in the command datastore 208 (block 734). For example, command translator 206 may store the third position in the record containing the speed for architectural covering 120 and in association with an identification of architectural covering 120.

Figure 8:
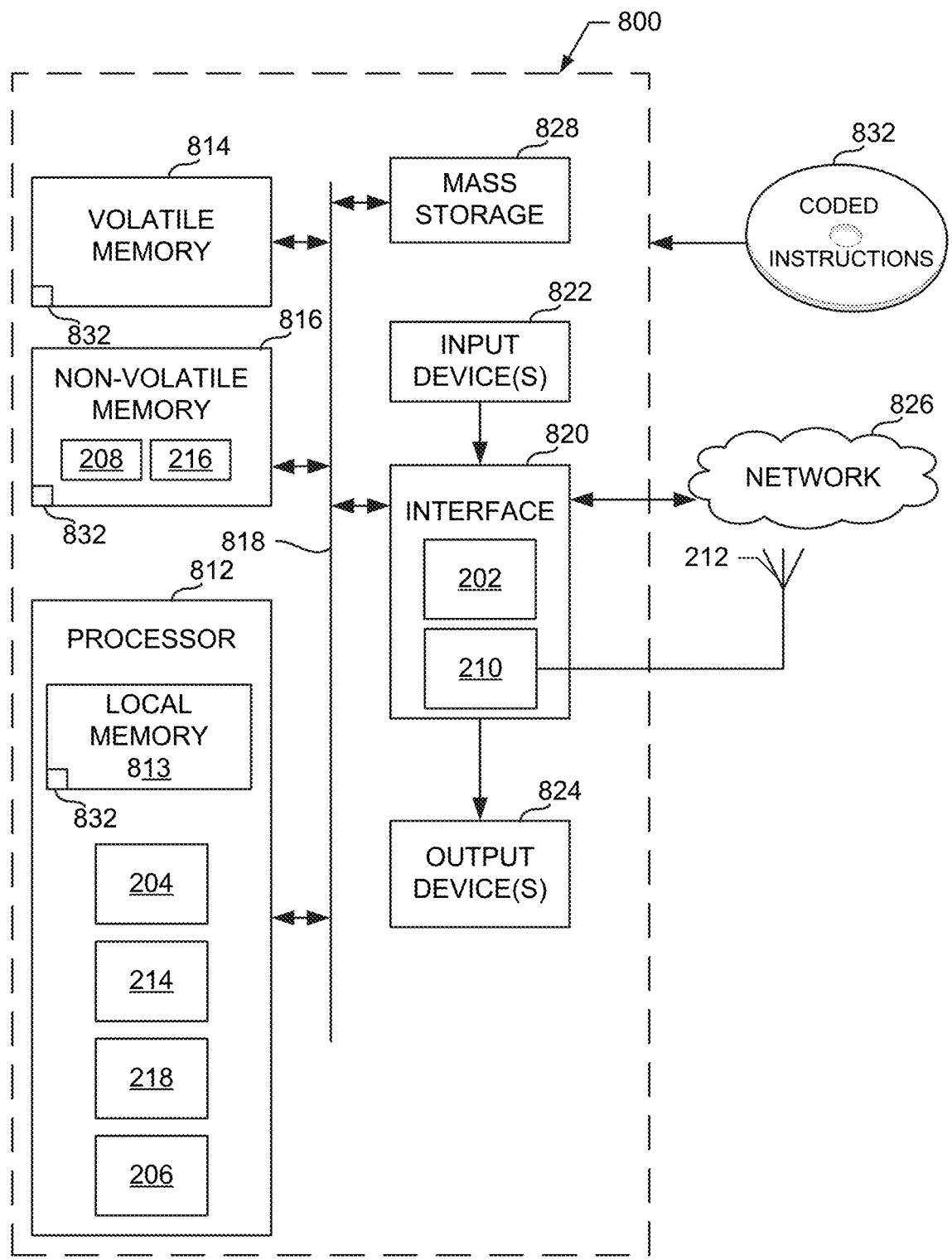
FIG. 8 is a block diagram of an example processing platform that may execute the instructions of FIGS. 4, 6, and 7 to implement the hub of FIG. 1 and/or FIG. 2.

FIG. 8 is a block diagram of an example processor platform 800 capable of executing the instructions of FIGS. 4, 6, and 7 to implement hub 102 of FIGS. 1 and/or 2. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors, or controllers from any desired family or manufacturer. The hardware processor may be a semiconductor based (e.g., silicon based) device. In this example, the processor 812 implements home control interface 204, command translator 206, software collector 214, and covering enumerator 218.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM) and/or any other type of random access memory device. The non-volatile memory 816 may be implemented by flash memory and/or any other desired type of memory device. Access to the main memory 814, 816 is controlled by a memory controller. In this example, non-volatile memory 816 includes command datastore 208 and software datastore 216.

The processor platform 800 of the illustrated example also includes an interface circuit 820. The interface circuit 820 may be implemented by any type of interface standard, such as an Ethernet interface, a universal serial bus (USB), and/or a PCI express interface. In this example, interface 820 includes network interface 202 and wireless covering interface 210, which may be coupled to antenna 212.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by at least one of display devices (e.g., a light emitting diode (LED), an organic light emitting diode (OLED), a liquid crystal display, a cathode ray tube display (CRT), a touchscreen, a tactile output device, a printer, and/or speakers). The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 4 and/or 6 may be stored in the mass storage device 828, in the volatile memory 814, in the non-volatile memory 816, and/or on a removable tangible computer readable storage medium such as a CD or DVD.

From the foregoing, it will be appreciated that example methods, apparatus and articles of manufacture have been disclosed that facilitate control updating of architectural coverings. In some examples, a disclosed hub facilitates interfacing architectural coverings with home control systems. The hub allows home control system to interact with architectural coverings even when architectural coverings are not communicatively coupled with the home control system and/or even when architectural coverings do not include an interface (e.g., an API) that can be accessed by the home control system. In some examples, a hub facilitates retrieval and installation of software instructions on architectural coverings. The hub accesses a repository via a network to retrieve software instructions even when architectural coverings cannot communicate on the network. Retrieving software instructions with the hub and distributing to a plurality of architectural coverings may reduce bandwidth on the network. Furthermore, to reduce computing resource load on the hub associated with pushing updates to architectural coverings (e.g., initiating transfer of the updates at the hub), the architectural coverings may retrieve/pull the software instructions from the hub. For example, the architectural coverings may poll the hub for a list of updates (e.g., periodically, aperiodically, in response to a user initiation, etc.) and/or the hub may transmit an advertisement of available updates (e.g., an advertisement that includes information about the updates but does not include the updates) to the architectural coverings. Based on the response to the polling and/or the advertisement, the architectural coverings may initiate retrieval of the updates from the hub (e.g., by transmitting a request for the updates to the hub).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a network interface to communicatively couple the apparatus with a repository via a network, the repository storing architectural covering software for one or more architectural coverings;
a wireless covering interface to communicatively couple the apparatus with a first architectural covering;
a processor; and
a memory storing instructions that, upon execution by the processor, configure the apparatus to:
determine first information about the first architectural covering including an architectural covering model number;
transmit, to the repository, a first request for the architectural covering software of the one or more architectural coverings, the first request identifying the architectural covering model number;
in response to receiving the architectural covering software indicating the architectural covering model number, store the architectural covering software in the memory;
transmit, to the first architectural covering after receiving the architectural covering software, second information including the architectural covering model number to which the architectural covering software applies; and
in response to receiving a second request for the architectural covering software from the first architectural covering, transmit the architectural covering software to the first architectural covering, wherein the second request is received after the second information is transmitted and is based on a determination by the first architectural covering that the architectural covering model is applicable to the first architectural covering.

2. The apparatus of claim 1, wherein the second information is transmitted in an advertisement of the architectural covering software to the first architectural covering.

3. The apparatus of claim 2, wherein the execution of the instructions further configures the apparatus to transmit the advertisement to a second architectural covering.

4. The apparatus of claim 1, wherein the second information comprises a unicast advertisement or a broadcast advertisement that identifies the architectural covering model number and a first software version.

5. The apparatus of claim 4, wherein the second request is received further based on a determination by the first architectural covering that the first software version is a more recent version than a second software version stored by the first architectural covering.

6. The apparatus of claim 1, wherein execution of the instructions further configure the apparatus to receive a transmission parameter from the first architectural covering via the wireless covering interface, wherein the transmission parameter indicates a size for transmitting the architectural covering software in chunks to the first architectural covering, and wherein the architectural covering software is transmitted to the first architectural covering in chunks based on the transmission parameter.

7. The apparatus of claim 1 further configured to:
in response to receiving user input indicating a movement command, transmit the movement command to the first architectural covering, wherein the movement command causes the first architectural covering to move based on the architectural covering software.

8. A method comprising:
determining first information about a first architectural covering including an architectural covering model number;
transmitting, to a repository via a network interface, a first request for architectural covering software of one or more architectural coverings, the first request identifying the architectural covering model number;
in response to receiving the architectural covering software indicating the architectural covering model number, storing the architectural covering software;
transmitting, to the first architectural covering after receiving the architectural covering software, second information including the architectural covering model number to which the architectural covering software applies; and
in response to receiving a second request for the architectural covering software from the first architectural covering, transmitting the architectural covering software to the first architectural covering via a wireless covering interface, wherein the second request is received after the second information is transmitted and is based on a determination by the first architectural covering that the architectural covering model is applicable to the first architectural covering.

9. The method of claim 8, wherein the second information is transmitted in an advertisement of the architectural covering software to the first architectural covering.

10. The method of claim 9, further including transmitting the advertisement to a second architectural covering.

11. The method of claim 8, further including storing the architectural covering software retrieved from the repository in a datastore.

12. The method of claim 11, wherein the first architectural covering pulls the architectural covering software from the datastore.

13. The method of claim 8, wherein the network interface communicates with the repository utilizing a first communication protocol and the wireless covering interface communicates with the first architectural covering utilizing a second communication protocol different from the first communication protocol.

14. The method of claim 13, wherein the second communication protocol does not utilize internet protocol.

15. A non-transitory computer readable medium comprising instructions that, when executed cause a machine to at least:
determine first information about a first architectural covering including an architectural covering model number;
transmit, to a repository via a network interface, a first request for architectural covering software of one or more architectural coverings, the first request identifying the architectural covering model number;
in response to receiving the architectural covering software indicating the architectural covering model number, storing the architectural covering software;
transmit, to the first architectural covering after receiving the architectural covering software, second information including the architectural covering model number to which the architectural covering software applies; and
in response to receiving a second request for the architectural covering software from the first architectural covering, transmit the architectural covering software to the first architectural covering via a wireless covering interface, wherein the second request is received after the second information is transmitted and is based on a determination by the first architectural covering that the architectural covering model is applicable to the first architectural covering.

16. The non-transitory computer readable medium of claim 15, wherein the second information is transmitted in an advertisement of the architectural covering software to the first architectural covering.

17. The non-transitory computer readable medium of claim 16, wherein the instructions, when executed, cause the machine to transmit the advertisement to a second architectural covering.

18. The non-transitory computer readable medium of claim 15, wherein the instructions, when executed, cause the machine to store the architectural covering software retrieved from the repository in a datastore.

19. The non-transitory computer readable medium of claim 18, wherein the first architectural covering pulls the architectural covering software from the datastore.

20. The non-transitory computer readable medium of claim 15, wherein the network interface communicates with the repository utilizing a first communication protocol and the wireless covering interface communicates with the first architectural covering utilizing a second communication protocol different from the first communication protocol.

21. The non-transitory computer readable medium of claim 20, wherein the second communication protocol does not utilize internet protocol.

\* \* \* \* \*